May 1, 1956
W. GRANDJOT
2,744,158
AUDIOMETER
Filed April 20, 1950
Fig 1
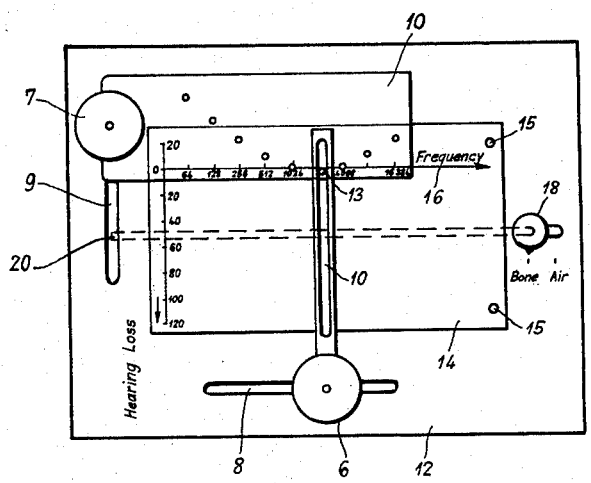
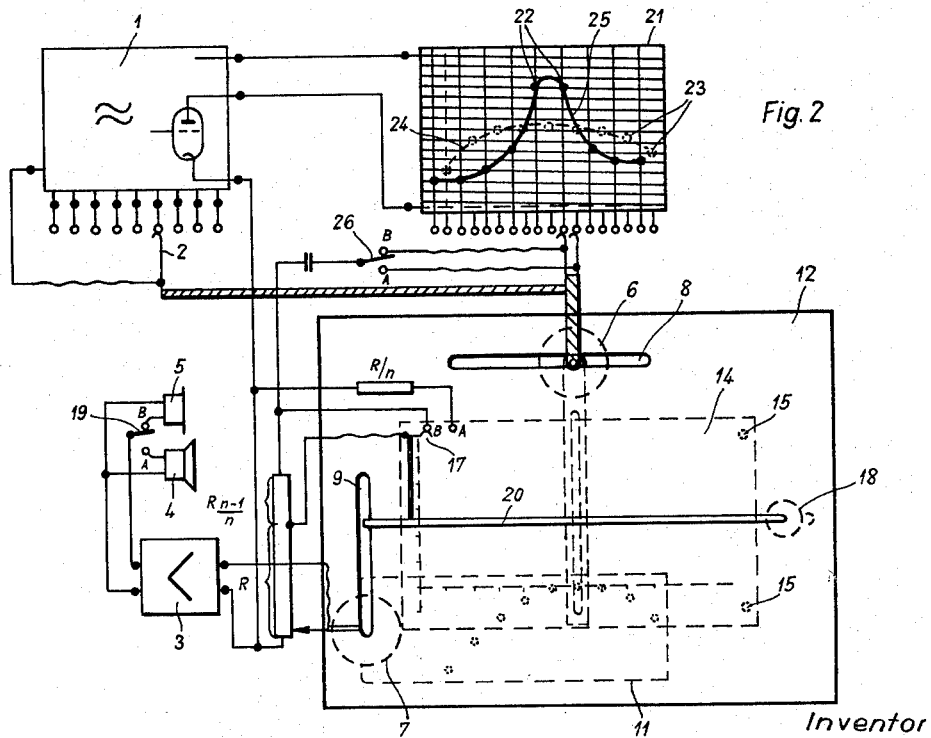
Fig. 2
Inventor
Walter Grandjot.

United States Patent Office 2,744,158
Patented May 1, 1956

2,744,158
AUDIOMETER

Walter Grandjot, Bremen, Germany

Application April 20, 1950, Serial No. 157,019

4 Claims. (Cl. 179—1)

The invention relates to audiometric devices or apparatus for recording the audiogram that is the threshold of hearing for pure tones of different frequencies. Till now the corresponding values of intensity of sound and frequency were read after adjustment and then entered by hand as coordinates into a diagram thus getting the points of the audiogram curve to be recorded. Also audiometers have been constructed in which the points of the diagram are written automatically by operating a knob of the recording equipment. This can be done either by the physician or by the patient himself. Those recording devices are complicated and unpractical.

The present invention will not perform the measurement and recording without the aid of the physician or another assistant but will release this person only of such works which can be fulfilled mechanically without disadvantage and which would lengthen the duration of the measurement unnecessarily. Therefore the adjustment of sound-intensity and preferably also the adjustment of the frequency is performed by hand and the record is facilitated by the fact that an indicating device with a recording surface is provided, on which the measuring spots resulting from the corresponding values of frequency and intensity of the test tone are only indicated but not recorded whereas the record has to be done by the aid of a marking stylus at the indicated spot of the two-coordinate system of the diagram sheet which is to be put on the said recording surface.

A constructional example of the invention is illustrated in the accompanying drawings, in which Fig. 1 shows a front view of the new testing equipment, Fig. 2 shows a back view of the recording system including the circuit diagram of the entire testing equipment.

The audiometer shown in the drawings includes a R–C–buzzer 1 generating a series of fixed frequencies ranging in octaves from 64 to 16 384 cycles which can be controlled by a selector 2. The test tones can be varied, not only with regard to their frequency but also with regard to their intensity, in a logarithmically divided scale and are produced by an earphone 4 for measuring the sound conduction through the air or by an earphone 5 for the conduction through the bones. Knobs 6 and 7 for adjustment of frequency and intensity of the test tone respectively are slidable in guides 8 and 9 arranged rectangularly to each other. To each knob is fixed a transparent pointer 10 resp. 11 moving over a recording table 12. The crossing point 13 of the two pointers 10 and 11 shows the measuring value searched for.

The pointer 10 for the frequency of the test tone has a slot, the pointer 11 for the amplitude or volume of the test tone has a plurality of holes according to the nine different frequencies from 64 to 16 384 cycles. A recording sheet which is provided with a system of rectangular coordinates printed on it can be put between the pointers 10, 11 and the table 12. The recording-device is acting semi-automatically. The slot in the pointer 10 indicates the abscissa of the hearing diagram or audiogram. The vertically movable knob 11 regulates the intensity or volume of the sound over a large range. From this device the data for the ordinate of the audiogram can be read. After the hearing minimum or threshold has been found for a certain frequency, the measuring point can be marked by a stylus which is put through the slot of the pointer 10 and the hole of the pointer 11 in correspondence with the slot. Pins 15, 15 are arranged at the table for engaging holes of the recording sheet. When the points corresponding to the nine frequencies are connected, the audiogram showing the diminution of the hearing capacity is complete. In the case of a normal person those points are found on the zero-line 16. For this purpose the system of coordinates has been chosen so that the hearing degree of the patient is indicated in comparison with the hearing degree of the normal hearing. Therefore the intensity of the test tone which is just sufficient to be perceived by a normal hearing is chosen as zero-value the audiogram of the normal hearing coinciding the axis 16 of the system. The sensitivity of the normal hearing is not the same at different frequencies. Furthermore, the used apparatus have another degree of efficiency at the different testing frequencies. In order to make it possible to use the same scale of sound intensity respectively of hearing loss, those dependencies on frequency are compensated in the following manner.

The compensation is performed partly by mechanical means and partly by electrical means in such a manner that the dependencies on frequency of the human sensitivity of hearing are compensated mainly by the mechanical means and that the dependencies on frequency of the apparatus, particularly of the earphones 4 and 5 are compensated mainly by the electrical means.

The mechanical compensation is performed in that manner that the pointer 11 for the hearing loss is not formed as a straight line but as a curve so that the audiogram of the normal hearing is coinciding the axis 16 of the system. Hearing losses are measured from the axis 16 down to 120 db and supersensitiveness is measured from the axis up to —20 db.

The electrical compensation is performed by a flat potentiometer-resistance 21 which is provided with two groups of nine slidable contacts 22, 22 . . . and 23, 23 . . . on either side of it. The contacts 22 and 23 can be adjusted independently from one another. At each testing frequency another contact of the group 22 or 23 is switched in by the knob 6 thereby changing the resistance at the output of the R–C–buzzer 1 according to a curve 24 of the contacts 22 at air conduction and according to a curve 25 of the contacts 23 at bone conduction. The contacts 22 correspond to the air-transmitter 4, the contacts 23 to the bone-transmitter 5.

The potentiometer 21 can be used for gauging. Thus, differing properties of exchanged earphones can be compensated. Of course the potentiometer can be used for compensating other dependencies on frequency of the apparatus and partly of the sensitivity of hearing and can be used for correction of inaccuracies of the mechanical compensating means.

The knob 7 for changing the intensity of the test tones takes measuring voltage increasing according to a logarithmic rule, from a system of resistance R, $$R\frac{n-1}{n}$$

and a shunt resistance $R/n$, where $n$ is a factor for the change of voltage necessary when changing over from air-conduction to bone conduction to give the same degree of loudness to a patient for both types of conduction, and applies them to the input of the measuring amplifier 3. If, for example, $n$ is 100, for obtaining an increase in volume of 40 decibels, then $$R\frac{n-1}{n}=R\frac{99}{100}$$

and the shunt $R/n = R/100$. Thus it will be seen that when the device is switched over to air-conduction, the voltage at the point between the two resistances $$R\frac{n-1}{n}$$

and R will be $\frac{1}{100}$ of the input voltage obtained from the potentiometer 21 and the total resistance will be R. On the other hand, when the device is switched over to bone-conduction, the resistances $R/n$ and $$R\frac{n-1}{n}$$

are short-circuited, thus the voltage at the point between the two resistances $$R\frac{n-1}{n}$$

and R is the total input obtained from the potentiometer 21. In order to obtain the same audiograms with air-conduction and bone-conduction when the degree of hearing is the same, a change over switch 17, 18 is provided which can be operated when changing over from the test for air conductivity to the test for bone conductivity and by which the measuring voltage is increased so much that the patient will perceive the same loudness at air-conduction as well as at bone-conduction. The switch mechanism 17, 18 includes a cross-bar 20 which, when the switch is in the position for bone-conduction, projects into the slot 9 thus serving as a stop for the knob 7 which therefore has the effect of displacing the upper limit of amplitude variation towards zero by an amount equal to the difference in level of response between air and bone-conduction so that the knob 7 cannot be moved beyond the equivalent maximum value which is about 80 db hearing loss. The mechanism 17, 18 carries switches 19 and 26 for the earphones 4, 5 and the contacts 22 and 23 of the potentiometer 21, respectively. When the sound is to be transmitted through the air, the dynamic earphone 4 is used and the switches 17, 18, 19 and 26 are in position Air or L. When the sound is to be transmitted through the bones the earphone 5 is pressed upon the mastoid-bone behind the ear to be examined and the switches 17, 18, 19 and 26 are in position Bone or K. The earphones 4 and 5 always remain connected to the apparatus.

The resistance 21 is a single resistance or single winding which is brought on a flat piece of insulating material. Of course, there could be a plurality of resistances instead of this single winding. The logarithmic rule is obtained by that the resistances $$R\frac{n-1}{n}$$

and R are logarithmic resistances of known manner. The expression $$\left(R+R\frac{n-1}{n}\right)$$

is not exact. I propose to change this expression by $$R, R\frac{n-1}{n}$$

and a shunt $$\frac{R}{n}$$

In this system $n$ is the factor of the change of voltage when switching over from air-conduction to bone-conduction. For example, $n$ may be 100 in order to get an increase of volume of 40 decibels. Then $$R\frac{n-1}{n}$$

is $$R\frac{99}{100}$$

and the shunt $$\frac{R}{n}$$

is $$\frac{R}{100}$$

From this will result, that the voltage at the point between the two resistances $$R\frac{n-1}{n}$$

and R will be $$\frac{1}{100}$$

of the in-put voltage, taken by the switch 26 from the potentiometer 21, when air-conduction is switched on. Then the entire resistance will be R. When switched over to bone-conduction the resistance $$\frac{R}{n}$$

is inactive and resistance $$R\frac{n-1}{n}$$

is inactive, too, by short-circuit. The voltage at the point between the two resistances $$R\frac{n-1}{n}$$

and R is the whole in-put voltage while in the case of air-conduction the voltage over resistance R is only $$\frac{1}{100}$$

of the in-put voltage. This is necessary in order to get the same loudness at bone-conduction as at air-conduction.

The control switch mentioned in claim 5, is not the volumetric switch 7, but the switch 17, which is labeled in the accompanying drawing. This switch is operated by the knob 18.

The element labeled 21, which is called a potentiometer, consists of a rectangular sheet of insulating material with a wire wound on it. I have shown the parts of the winding line behind the insulating sheet in the drawing. The other wires which are connected to the contacts below the potentiometer 21 are not connected to one another but consist of wires which are arranged with distance from the winding on the sheet 21 and are connected only in one point each which are arranged along the curves 24, 25. Number 1, is a variable controlled oscillator and the frequency is controlled by the sliding connector, too.

By the connections 22 and 23 along the curves 24 and 25 of the winding of the potentiometer different parts of the voltage at the entrance to the potentiometer from the oscillator 1 are given to the resistances R, $$R\frac{n-1}{n}$$

and $$\frac{R}{n}$$

and from there to the amplifier 3. The potentiometer is a device for compensating all dependences on frequency of the apparatus and of the human ear. The voltage coming from the oscillator 1 and being so compensated by the potentiometer 21 then is given to the resistances which are switched or changed by the volumetric switch 7, according to logarithmic steps both when air-conduction or bone-conduction is switched on. The resistance $$\frac{R}{n}$$

only is arranged for compensating the difference of conductivity between air-conduction and bone-conduction in order to be able to use the same volume dial for the measurement for bone- and air-conduction.

It will be recognized that the system and circuits specifically described herein can be subject to considerable modifications without departing from the spirit and scope of my invention. The pointer 11 can be provided with a slot like the pointer 10 in order to change the frequency not in steps but continuously. The mechanical pointers could be arranged beneath a transparent recording table as diaphragms for guiding a light beam which shows the spots on the recording sheet where to mark the measuring points of the audiogram by a stylus. Also the pointers, particularly the pointer 11 may be interchangeable, i. e. in order to get the right compensation at air conduction and bone conduction without electrical switching means.

What I claim is:

1. In an apparatus for measuring hearing loss, a table for receiving a card on which a plot of hearing loss intensity against frequency may be made, means manually operated for varying the frequency of a tone over substantially the audible hearing range, said means having an arm movable therewith over said card for indicating the frequency at which said manual means is being operated, means manually operated for varying the intensity of said tone at the desired operating frequency, said last means comprising a marking card having holes therein plotted in accordance with hearing loss values for a normal person at different frequencies with reference to a zero line, means for moving said card at right angles to said arm for controlling the intensity of the tone whereby when threshold intensities are being observed, the position of the marking card and holes therein indicate the point of the selected volume at the selected frequency and thereby the hearing loss intensity for the individual on whom the measurements are being made.

2. In an apparatus as set forth in claim 1, wherein said last named marking card has points plotted thereon to compensate for the dependency of frequency with regard to ear sensitivity.

3. In an arrangement as set forth in claim 2 including additional electrical means for compensating for hearing loss intensity, said electric means comprising a potentiometer device having a plurality of contacts to provide different voltage resistances according to a logarithmic scale to the input of a measuring amplifier, said measuring amplifier serving to produce the tone signal.

4. In an apparatus as set forth in claim 1 for measuring hearing loss for air- and bone-conduction including means for generating fixed frequencies ranging over wide frequency ranges and greatly varying amplitudes, means for changing the amplitude of the tones generated according to a logarithmic rule with a system of resistances having values R, $$R\frac{n-1}{n}$$

and a shunt $$\frac{R}{n}$$

where $n$ is a factor for the change of voltage necessary when changing over from air-conduction to bone-conduction, a measuring amplifier means for impressing the fixed frequencies upon said measuring amplifier, means for impressing the output of the measuring amplifier upon the ear either in air- or bone-conduction and means for noting the frequency and amplitude of tone as elements in the measuring curve.

References Cited in the file of this patent
UNITED STATES PATENTS

| | | |
|---|---|---|
| 2,072,705 | Bloomheart | Mar. 2, 1937 |
| 2,087,838 | Clifford | July 20, 1937 |
| 2,257,263 | Koren | Sept. 30, 1941 |

FOREIGN PATENTS

| | | |
|---|---|---|
| 915,169 | France | Oct. 29, 1946 |